United States Patent [19]

Lemon et al.

[11] Patent Number: 4,474,904

[45] Date of Patent: Oct. 2, 1984

[54] FOUNDRY MOULDS AND CORES

[76] Inventors: Peter H. R. B. Lemon, Paudale, Newtown Rd., Sherfield; Jeffrey D. Railton, 12 Bracken La., Shirley Wassen, Southampton; Derek W. Baker, 28 Blossom Close, Botley, Southampton; Vincent J. Coppock, 19 Dependence Close, St. Oswalds Park, Malpas, Cheshire, all of England

[21] Appl. No.: 434,462

[22] Filed: Oct. 14, 1982

[30] Foreign Application Priority Data

Jan. 21, 1982 [GB] United Kingdom ............... 8201668

[51] Int. Cl.³ .................................................. C08K 3/36
[52] U.S. Cl. ..................................... 523/146; 524/596
[58] Field of Search ...................... 523/144, 145, 146

[56] References Cited

U.S. PATENT DOCUMENTS

| 3,234,159 | 2/1966 | Cooper | 523/145 |
| 3,599,433 | 8/1971 | Murata et al. | 405/264 |
| 3,696,622 | 10/1972 | Tohma et al. | 405/264 |
| 3,720,642 | 3/1973 | Junger et al. | 523/145 |

FOREIGN PATENT DOCUMENTS

| 1065605 | 9/1959 | Fed. Rep. of Germany . |
| 50-130627 | 10/1975 | Japan . |
| 2059972A | 4/1981 | United Kingdom . |

OTHER PUBLICATIONS

*Chem. Abst.* 84, 125183c (1976).

*Primary Examiner*—Lewis T. Jacobs

[57] ABSTRACT

A foundry moulding composition comprising
(a) a granular refractory material,
(b) from 0.25 to 2.5% based on the weight of the refractory material of an aqueous solution of a potassium alkali phenol-formaldehyde resin, said aqueous solution having a solids content of from 50 to 75% and said resin having a weight average molecular weight ($\overline{M}_{wr}$) of from 700 to 2000, a formaldehyde:phenol molar ratio of from 1.2:1 to 2.6:1 and a potassium hydroxide:phenol molar ratio of from 0.5:1 to 1.2:1;
(c) from 0.05 to 3% based on the weight of said aqueous solution, of at least one silane, and
(d) from 20 to 110% based on the weight of said aqueous solution of at least one ester active to catalyze curing of said resin.

22 Claims, No Drawings

FOUNDRY MOULDS AND CORES

BACKGROUND OF THE INVENTION

This invention relates to the manufacture of foundry moulds and cores and to moulding compositions useful therein. More particularly, the invention relates to the use of highly condensed potassium alkali phenolic resins in the binders for the moulds and cores.

Phenol-formaldehyde (PF), phenol-formaldehyde/furfuryl alcohol (PF/FA), urea-formaldehyde/furfuryl alcohol (UF/FA) and furfuryl alcohol-formaldehyde condensation products, catalyzed with strong acid catalysts, such as phosphoric acid, sulphuric acid and para-toluene sulphonic acid and the like, are well known as binders for sand in the production of cold-setting foundry moulds and cores. Aromatic sulphonic acids are more commonly employed than all other types but have the disadvantage that pungent fumes of sulphur dioxide are evolved on thermal decomposition.

UF/FA condensation products contain nitrogen which can form ammonia on thermal decomposition and this tends to neutralize the sulphur dioxide. However, nitrogen in the binder can react with certain metals, such as, for example, grey and nodular irons and steel, resulting in the formation of small bubbles in the final casting, a defect known in the foundry industry as "pinholing". The employment of UF/FA binders is consequently restricted.

Phosphoric acid may be employed as a catalyst but tends to build up on the sand on repeated attrition reclamation and this reduces the refractoriness of the sand. Phosphoric acid is also incompatible with PF/FA condensation products and, as a result, the moulds and cores produced exhibit poor bond strengths.

In the foundry moulding art the use of aqueous highly alkaline phenol-aldehyde resins as binders for sand has not been developed because they tend to produce weak cores. It is known in other fields that the curing of phenol-formaldehyde resins can be catalyzed by esters. The application of this to foundry moulds and cores has been suggested in Japanese Patent publication (Kokai) No. 130627/1975 and copending U.S. application Ser. No. 224,131, filed Jan. 12, 1981. Whilst these specifications show that foundry cores and moulds having adequate strength and strength increase with time can be made they require the use of relatively high proportions of resin which is costly and makes recovery of the sand, after casting, more difficult.

The present invention is based on the discovery that the use of highly condensed phenol-formaldehyde resins can give moulds and cores which have adequate strength and strength increase at much lower levels of resin. The use of such highly condensed resins in making foundry moulds and cores has not been considered practicable, heretofore.

SUMMARY OF THE INVENTION

The present invention accordingly provides a method of making a foundry mould or core which comprises mixing granular refractory material with a binder which comprises:
1. from 0.25% to 2.5% by weight of the granular refractory material of an aqueous solution, having a solids content of from 50% to 75% by weight, of a potassium alkali-phenol-formaldehyde resin having the following characteristics:
   (a) a weight average molecular weight ($\overline{M}_w$) of from 700 to 2000;
   (b) a formaldehyde:phenol molar ratio of from 1.2:1 to 2.6:1; and
   (c) a KOH:phenol molar ratio of from 0.5:1 to 1.2:1;
2. from 0.05% to 3% by weight on the weight of the resin solution of at least one silane; and
3. from 25% to 110% by weight of the resin solution of at least one ester active to catalyze curing of the resin;

forming the mixture and allowing the mixture to set by curing of the resin in the binder.

The moulding composition comprising the mixture of granular refractory material and binder as set out above is believed to be novel and, accordingly, forms part of the invention.

DETAILED DESCRIPTION OF THE INVENTION

The granular refractory materials used in the present invention may be any of the refractory materials commonly employed in the foundry industry for the production of moulds and cores, such as silica sand, quartz, chromite sand, zircon or olivine sand. The compositions of the invention have the particular advantage that the difficulties commonly associated with the bonding of sands of alkaline reaction, such as olivine and chromite, or beach sands containing shell fragments, and which arise from neutralization or partial neutralization of the acid catalyst used in conventional systems, are completely overcome, since in this invention the resin binder is cured under alkaline conditions. The invention is, therefore, of particular utility where it is necessary or desirable to employ alkaline sands.

The nature of the phenol-formaldehyde resin used is a most important feature of the present invention. There are several features of the resin which are important. Since the present invention is directed to cold set techniques, the resin binder will be used as an aqueous solution of the resin. The solids content of the aqueous solution is in the range 50 to 75% by weight. Solids contents below 50% are not used because they contain too much water which reduces the effectiveness of the binder. Solids contents above 75%, are not used because the viscosity becomes too high.

The phenol-formaldehyde resins used in this invention have a weight average molecular weight ($\overline{M}_w$) of from 700 to 2000 and preferably from 800 to 1700. Resins with $\overline{M}_w$ less than 700, such as were used in copending U.S. Ser. No. 224,131, give products which are relatively weaker or require significantly more resin to achieve similar strengths. Resins with $\overline{M}_w$ greater than 2000 are either not adequately water soluble within the range of KOH contents used in the invention or precipitate out of solution or cause the solution to gel before the resin has cured adequately yielding products with poor strength.

Optimum results may not be obtained within the broad $\overline{M}_w$ range at the extreme limits of the ranges of KOH:phenol and formaldehyde:phenol molar ratios, especially at the lower end of the KOH:phenol ratio. We have obtained satisfactory results showing the advantage of the invention throughout the 800 to 1700 $\overline{M}_w$ range. We have, to date, obtained optimum results using resins having $\overline{M}_w$ greater than 950.

The resins used in this invention are potassium alkaline phenol-formaldehyde resins by which is meant that the alkali in the resin is potassium alkali. This alkali can be present in the resin during manufacture or, more usually, post added to resin as KOH, preferably in aqueous solution of suitable strength. The alkalinity of the resin is expressed in terms of its KOH content and specifically by the molar ratio of KOH to the phenol in the resin. Other alkalis are not expressly excluded and may be present in minor amounts but will not be specifically added because they slow curing of the resin and give products having lower strength. We have found that substituting the KOH used in the invention by an equimolar amount of NaOH gives cores which typically have half the strength after 1 hour and only achieve two third the strength after 24 hours of cores made using KOH as the alkali.

The molar ratio of KOH:phenol in the resin solution is in the range 0.5:1 to 1.2:1 and preferably 0.6:1 to 1.2:1. At ratios less than 0.5 the speed of cure and product strength are much reduced. The reasons for this are not entirely clear but it seems probable that at such low ratios the resin tends to be insoluble or precipitates from solution during curing. Also we believe that a relatively high KOH:phenol ratio increases the concentration of phenolate type anions which enhances activity of the resin to curing by cross-linking. Ratios higher than 1.2 are not used because the excess KOH makes the resins hazardous to handle and inhibits curing by oversolubilizing the resin and/or reducing the effect of ester catalysis. The use of KOH:phenol ratios lower than 0.6 is not preferred with resins having $\overline{M}_w$ less than 800 because the speed of cure and product strength is below optimum.

The resins used have a formaldehyde to phenol molar ratio of from 1.2:1 to 2.6:1. Lower ratios are not used because lower strengths are obtained in use. Higher ratios are not used because they are either of low molecular weight, or are excessively crosslinked, or contain undesirably high levels of unreacted formaldehyde. Especially, within the preferred limits of this ratio suitable highly condensed resins, with low levels of unreacted formaldehyde and high reactivity can be obtained.

It is a subsidiary aspect of this invention that the resin used satisfies the following criteria:
 (a) $\overline{M}_w$ from 800 to 1700;
 (b) KOH:phenol molar ratio 0.6:1 to 1.2:1; and
 (c) formaldehyde:phenol molar rato 1.2:1 to 2.6:1.

The curing catalyst used in the invention is an ester. Suitable esters include low molecular weight lactones e.g., γ-butyrolactone, propiolactone, and ξ-caprolactone, and esters of short and medium chain e.g. $C_1$ to $C_{10}$ alkyl mono- or polyhydric alcohols, with short or medium chain e.g. $C_1$ to $C_{10}$ carboxylic acids especially acetic acid. We have obtained very good results using triacetin (glyceryl triacetate) as the catalyst.

The amount of catalyst used is in the range 20% to 110%, preferably 25% to 40% by weight on the weight of resin solution used, corresponding approximately to 10% to 80% by weight on the weight of solid resin in the solution. The optimum in any particular case will depend on the ester chosen and the properties of the resin. The mechanism of catalysis is not certain but we believe that it involves the initial nucleophilic attack by anionic sites in the resin on the ester which activates the resin to crosslinking reactions in the presence of the alkali.

A silane is included in the mixture to improve product strength. Amounts as low as 0.05% by weight on the weight of resin solution provide a significant improvement in strength. Increasing the amount of silane gives greater improvements in strength up to about 0.6% by weight of the resin solution. Higher silane concentrations are not preferred because of added cost. Further, because the silane typically used is δ-aminopropyltriethoxy silane which contains nitrogen, use of excess silane may increase the risk of pinholing defects and for these reasons amounts in excess of 3% by weight on the resin solution are not used.

The following Examples illustrate the invention. The techniques used in the Examples are described below:

MANUFACTURE OF PHENOL FORMALDEHYDE RESIN SOLUTIONS

100% phenol was dissolved in 50% aqueous KOH in an amount corresponding to the desired KOH:phenol molar ratio (from 0.5 to 1.2). The solution was heated to reflux and 50% aqueous formaldehyde was added slowly, whilst maintaining reflux, in an amount corresponding to the desired formaldehyde:phenol molar ratio (1.6, 1.8 or 2.0). The reaction mixture was maintained under reflux until it attained a pre-determined viscosity corresponding to the desired value of $\overline{M}_w$. (If desired the solids content can be adjusted by distillation, but this is not usually necessary, a further advantage of the invention. In some cases minor amounts of KOH solution were added to adjust the KOH:phenol ratio, but this would not be necessary in full scale production.) The resin solution was cooled to 40° C. and 0.4% by weight on the weight of the resin solution of δ-aminopropyl triethoxy silane was added.

TESTING OF RESINS (a) viscosity—measured using an Ostwald (U-tube) viscometer at 25° C.
(b) solids content—measured by heating a weighed sample (2.0±0.1 g) in an air circulating oven for 3 hrs at 100° C.
(c) Molecular weight ($\overline{M}_w$)—measured using gel permeation chromatography. Samples were prepared by precipitating resin from the resin solution by adding $H_2SO_4$; separating, washing and drying the precipitate and dissolving it in tetrahydrofuran.

PREPARATION OF TEST FOUNDRY CORES 1 kg of the selected sand was charged to a Fordath laboratory coremixer. The ester catalyst was added and mixed for 1 min and the resin solution was then added. Mixing was continued for 1 min and the mixture then quickly discharged into the test moulds. One sample was rammed into a waxed paper cup which was squeezed by hand to assess the bench life and when setting had occurred. Other samples were formed into 5×5 cm cylindrical test cores by the standard method recommended by I.B.F. working party P. The test cores were placed in a standard atmosphere, 20° C.; 50% relative humidity, and samples were tested for compression strength 1 hr, 2 hr, 4 hr and 24 hr after manufacture. All compression test cores were made within 2 minutes of discharge of the mix.

In the Examples tests designated with a letter (tests A to F) are comparative tests outside the invention, tests designated with a number (1 to 22) are of the invention.

EXAMPLE 1

This Example illustrates the effect of phenol-formaldehyde resin $\overline{M}_w$ on core performance.

Test cores were made from the following starting materials

Phenol-formaldehyde resin solution
$\overline{M}_w$—variable—see Table 1
Formaldehyde:phenol molar ratio 2:1
KOH:phenol molar ratio 0.85:1
Solids 64% by weight
Amount 1.5% by weight on sand.
Sand—Chelford 50
Silane—0.4% by weight on resin solution of γ-aminopropyltriethoxysilane
Catalyst 30% by weight on resin solution of triacetin (0.45% on sand)

The values of $\overline{M}_w$ and test results are set out in Table 1. Tests A and B are of resins outside the $\overline{M}_w$ range of this invention. The results show that the benefit of the invention is obtained within a restricted range of $\overline{M}_w$.

TABLE 1

| Test No. | A | 1 | 2 | 3 | 4 | 5 | 6 | B |
|---|---|---|---|---|---|---|---|---|
| $\overline{M}_w$ | 560 | 718 | 849 | 966 | 1050 | 1217 | 1320 | ∞(3) |
| Viscosity (cSt) | — | 81 | 111 | 144 | 167 | 321 | 364 | 501 |
| Bench Life (mins) | 65 | 23 | 19 | 16 | 14(2) | 10 | 10 | 2 |
| Set Time (mins) | 180 | 32 | 28 | 22 | 22(2) | 16 | 15 | 3 |
| Compression Strength (kPa)(1) | | | | | | | | |
| 1 hr | 0 | 690 | 1580 | 2070 | 2050(2) | 2465 | 2415 | 0 |
| 2 hr | 0 | 1950 | 2765 | 2960 | 2685(2) | 3000 | 3000 | 0 |
| 4 hr | 0 | 2860 | 3200 | 3520 | 2750(2) | 3300 | 3300 | 0 |
| 24 hr | 1480 | 4785 | 4800 | 5000 | 4650(2) | 4400 | 4400 | 800 |

(1)"0" figures for Compression strength mean that the resin had not set at the test time or the core was soft.
(2)Average of 2 runs.
(3)"∞" means the $M_w$ is >2000 and was too high to measure by the method used.

EXAMPLE 2

Example 1 was repeated using resins having a lower KOH:phenol molar ratio.
Phenol-formaldehyde resin solution
e,ovs/M/ w—variable—see Table 2
KOH:phenol molar ratio 0.65:1
formaldehyde:phenol molar ratio 2:1
Solids 66% by weight
Amount 1.5% by weight on sand.
Sand—Chelford 50
Silane—0.4% by weight on resin solution of γ-aminopropyltriethoxysilane
Catalyst 30% by weight on resin solution of triacetin.
The values of $\overline{M}_w$ and test results are set out in Table 2. The results are similar to those of Example 1. The result of Test No. 7 could be improved using γ-butyrolactone as the catalyst.

TABLE 2

| Test No. | 7 | 8 | 9 | 10 |
|---|---|---|---|---|
| $\overline{M}_w$ | 718 | 849 | 966 | 1050 |
| Viscosity (cSt) | 107 | 202 | 320 | 405 |
| Bench Life (mins) | 35 | 24 | 18 | 15 |
| Set Time (mins) | 70 | 40 | 30 | 26 |
| Compression Strength (kPa) | | | | |
| 1 hr | 0 | 740 | 1085 | 1285 |
| 2 hr | 590 | 1600 | 1875 | 2200 |
| 4 hr | 1085 | 2350 | 2650 | 2900 |
| 24 hr | 3000 | 4400 | 4350 | 5000 |

EXAMPLE 3

This Example illustrates the use of different levels of and different catalysts and gives a comparison with the system of U.S. Ser. No. 224,131.

TABLE 3

| Test No. | 11 | 12 | C(3) |
|---|---|---|---|
| $\overline{M}_w$ | 966 | 966 | 560 |
| Viscosity (cSt) | 144 | 144 | ca 70 |
| KOH:phenol | 0.85 | 0.85 | 0.52 |
| formaldehyde:phenol | 2 | 2 | 1.8 |
| Solids (%) | 64 | 64 | 68.1 |
| Amount of binder (%)(1) | 1.4 | 1.33 | 2.1 |
| Catalyst(2) | γ-Bu | TAc | γ-Bu |
| Amount of Catalyst (%) | 30 | 25 | 32 |
| Bench Life (mins) | 3 | 18 | 5 |
| Set Time (mins) | 5 | 24 | 8 |
| Compression Strength (kPa) | | | |
| 1 hr | 2320 | 1725 | 1725 |
| 2 hr | 2950 | 2765 | 2450 |
| 4 hr | 3300 | 3500 | 3350 |
| 24 hr | 4500 | 5000 | 4800 |

Test C is Example 6 of U.S. Ser. No. 224,131
(1)Amount of Binder is solids content of binder including resin alkali and catalyst as % by weight on sand
(2)γ-Bu = γ-butyrolactone. TAc-triacetin.
(3)For Test C the data are based on the resin solution i.e. the combination of the 6 parts of 'resin'and the 2.4 parts of 50% KOH solution.

EXAMPLE 4

This Example illustrates the effect of variation of the KOH:phenol molar ratio.
Phenol-formaldehyde resin solution.
$\overline{M}_w$ 966
formaldehyde:phenol molar ratio 2:1
KOH:phenol molar ratio-variable-see Table 4.
Solids 64% by weight
Amount varies to maintain solid organic resin to sand ratio—see Table 4.
Sand—Chelford 50
Silane 0.4% by weight on resin solution of γ-aminotriethoxy silane
Catalyst 30% by weight on resin solution of triacetin.
The results are set out in Table 4.

TABLE 4

| Test No. | 13 | 14 | 15 | 16 | 17 |
|---|---|---|---|---|---|
| KOH:phenol molar ratio | 0.34 | 0.51 | 0.68 | 0.85 | 1.02 |
| Wt % resin solution on sand | 1.33 | 1.41 | 1.5 | 1.59 | 1.67 |
| Bench life (mins) | 30 | 18 | 15 | 12 | 9 |

TABLE 4-continued

| Test No. | 13 | 14 | 15 | 16 | 17 |
| --- | --- | --- | --- | --- | --- |
| Set Time (mins) | 100 | 29 | 23 | 19 | 15 |
| Compression Strength (kPa) | | | | | |
| 1 hr | 0 | 890 | 2070 | 2615 | 2465 |
| 2 hr | 200 | 1625 | 2715 | 3305 | 3110 |
| 4 hr | 440 | 2220 | 3355 | 3550 | 3395 |
| 24 hr | 1875 | 3995 | 5032 | 4537 | 4271 |

EXAMPLE 5

This Example further illustrates the variation of KOH:phenol molar ratio at lower formaldehyde:phenol (f:phenol) molar ratios and values of $\overline{M}_w$. The results are set out in Table 5. In all cases the resin solution was used at 1.5% by weight on the sand and including 0.4% by weight on the resin solution of γ-aminopropyltriethoxy silane. The catalyst was triacetin 30% by weight on the resin solution.

TABLE 5

| Test No. | D | 18 | E | 19 | F | 20 | 21 | 22 |
| --- | --- | --- | --- | --- | --- | --- | --- | --- |
| $\overline{M}_w$ | 650 | 800 | 720 | 950 | 650 | 900 | 1100 | 1603 |
| Viscosity (cSt) | 191 | 276 | 478 | 460 | 600 | 414 | 277 | 350 |
| Solids (%) | 62.7 | 63.2 | 63.2 | 66.1 | 65.4 | 66.2 | 60.2 | 58 |
| f:phenol ratio | 1.8 | 1.8 | 1.8 | 1.8 | 1.6 | 1.6 | 1.6 | 1.6 |
| KOH:phenol ratio | 0.46 | 0.79 | 0.46 | 0.79 | 0.45 | 0.79 | 0.79 | 0.75 |
| Bench Life (mins) | 60 | 14 | 35 | 10 | 45 | 20 | 12 | 11 |
| Set Time (mins) | 220 | 20 | 90 | 16 | 120 | 35 | 18 | 15 |
| Compression (kPa) | | | | | | | | |
| 1 hr | 0 | 2465 | 0 | 2515 | 0 | 1235 | 1875 | 2270 |
| 2 hr | 0 | 3100 | 350 | 3300 | 150 | 2200 | 2860 | 3060 |
| 4 hr | 150 | 3350 | 790 | 3300 | 350 | 2800 | 3300 | 3500 |
| 24 hr | 1240 | 4500 | 2660 | 4000 | 2150 | 4000 | 4600 | 4685 |

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A foundry moulding composition comprising
   (a) a granular refractory material,
   (b) from 0.25 to 2.5% based on the weight of the refractory material of an aqueous solution of a potassium alkali phenol-formaldehyde resin, said aqueous solution having a solids content of from 50 to 75% and said resin having a weight average molecular weight ($\overline{M}_w$) of from 700 to 2000, a formaldehyde:phenol molar ratio of from 1.2:1 to 2.6:1 and a potassium hydroxide:phenol molar ratio of from 0.5:1 to 1.2:1;
   (c) from 0.05 to 3% based on the weight of said aqueous solution, of at least one silane, and
   (d) from 20 to 110% based on the weight of said aqueous solution of at least one ester active to catalyze curing of said resin.

2. The composition of claim 1 wherein the refractory material is selected from the group comprising silica sand, quartz, chromite sand, zircon, olivine sand or beach sands containing shell fragments.

3. The composition of claim 2 wherein the refractory material is chromite sand, olivine sand or beach sands containing shell fragments.

4. The composition of claim 1 wherein the $\overline{M}_w$ of said resin is from 800 to 1700.

5. The composition of claim 4 wherein said $\overline{M}_w$ is from 950 to 1700.

6. The composition of claim 1 or 4 wherein the potassium hydroxide:phenol molar ratio is from 0.6:1 to 1.2:1.

7. The composition of claim 1 wherein said silane is γ-aminopropyltriethoxysilane.

8. The composition of claim 1 wherein from 25% to 40% by weight of said aqueous solution of said ester catalyst is present.

9. The composition of claim 8 wherein said ester is a low molecular weight lactone or an ester of a $C_{1-10}$ alkyl mono- or polyhydric alcohol with a $C_{1-10}$ carboxylic acid.

10. The composition of claim 9 wherein said lactone is selected from the group comprising γ-butyrolactone, propiolactone and ξ-caprolactone.

11. The composition of claim 9 wherein said carboxylic acid is acetic acid.

12. The composition of claim 11 wherein said ester is glycerol triacetate.

13. A process for the production of foundry moulds or cores which comprises,
   mixing granular refractory material with a binder, wherein said binder comprises (a) from 0.25% to 2.5% based on the weight of the refractory material of an aqueous solution of a potassium alkali phenol-formaldehyde resin, said aqueous solution having a solids content of from 50% to 75% and said resin having a weight average molecular weight ($\overline{M}_w$) of from 700 to 2000, a formaldehyde:phenol molar ratio of from 1.2:1 to 2.6:1 and a potassium hydroxide:phenol molar ratio of from 0.5:1 to 1.2:1, (b) from 0.05% to 3% based on the weight of said aqueous solution of at least one silane, and (c) from 20% to 110% based on the weight of said aqueous solution of at least one ester active to catalyze curing of said resin,
   discharging the mixture into a corebox or pattern mold, and allowing the resin to cure.

14. The process of claim 13 wherein the refractory material is selected from the group comprising silica sand, quartz, chromite sand, zircon, olivine sand or beach sands containing shell fragments.

15. The process of claim 14 wherein the refractory material is chromite sand, olivine sand or beach sands containing shell fragments.

16. The process of claim 14 wherein the $\overline{M}_w$ of said resin is from 800 to 1700.

17. The process of claim 16 wherein the potassium hydroxide:phenol molar ratio is from 0.6:1 to 1.2:1.

18. The process of claim 13 wherein from 25% to 40% by weight of said aqueous solution of said ester catalyst is utilized.

19. The process of claim 17 wherein from 25% to 40% by weight of said aqueous solution of said ester catalyst is present.

20. The process of claim 19 wherein said ester is a low molecular weight lactone or an ester of a $C_{1-10}$ alkyl mono- or polyhydric alcohol with a $C_{1-10}$ carboxylic acid.

21. The process of claim 20 wherein said carboxylic acid is acetic acid.

22. The process of claim 21 wherein said ester is glycerol triacetate.

* * * * *

UNITED STATES PATENT AND TRADEMARK OFFICE
CERTIFICATE OF CORRECTION

PATENT NO. : 4,474,904

DATED : October 2, 1984

INVENTOR(S) : Peter H.R.B. LEMON, Jeffrey D. RAILTON, Derek W. BAKER and Vincent J. COPPOCK It is certified that error appears in the above-identified patent and that said Letters Patent is hereby corrected as shown below:

On the title page;
[73] Assignee: Borden (UK) Limited, Southampton, England

Signed and Sealed this

Twenty-third Day of July 1985

[SEAL]

Attest:

DONALD J. QUIGG

Attesting Officer     Acting Commissioner of Patents and Trademarks